United States Patent [19]
Sieben

[11] Patent Number: 5,218,437
[45] Date of Patent: Jun. 8, 1993

[54] SIGNAL SEPARATOR FOR SEPARATING TELETEXT BIT SEQUENCES FROM A BROADCAST TELEVISION SIGNAL

[75] Inventor: Ulrich Sieben, Reute, Fed. Rep. of Germany

[73] Assignee: Deutsche ITT Industries GmbH, Frieburg, Fed. Rep. of Germany

[21] Appl. No.: 749,797

[22] Filed: Aug. 26, 1991

[30] Foreign Application Priority Data

Aug. 29, 1990 [EP] European Pat. Off. ............ 9011653

[51] Int. Cl.⁵ ............................................. H04N 7/04
[52] U.S. Cl. ..................................... 358/147; 375/94
[58] Field of Search ............... 358/147, 146, 167, 905; 375/94

[56] References Cited

U.S. PATENT DOCUMENTS

| | | | |
|---|---|---|---|
| 4,594,516 | 6/1986 | Tokumitsu | 307/269 |
| 4,672,639 | 6/1987 | Tanabe et al. | 375/118 |
| 4,673,979 | 6/1987 | Kobo et al. | 358/142 |
| 4,768,208 | 8/1988 | Cornett | 360/40 |
| 4,794,626 | 12/1988 | Tanabe | 358/148 |

FOREIGN PATENT DOCUMENTS

| | | |
|---|---|---|
| 0023852 | 2/1981 | European Pat. Off. . |
| 0044402 | 1/1982 | European Pat. Off. . |
| 3624375 | 10/1987 | Fed. Rep. of Germany . |
| 2129658 | 5/1984 | United Kingdom . |

OTHER PUBLICATIONS

H. Matsue, et al., "Teletext Equalizer LSI," 1988 International Conference on Consumer Electronics, Part 1, IEEE, No. 3, New York, N.Y., Aug. 1988.

*Primary Examiner*—Alvin E. Oberley
*Assistant Examiner*—Minsun Oh
*Attorney, Agent, or Firm*—Thomas L. Peterson

[57] ABSTRACT

A signal separator, particularly a teletext-signal separator, includes an integrating unit which delivers a center-of-bit-indicating (i.e., center-crossing) signal and a residual-value signal. A residual-value-signal-evaluating device evaluates the respective residual value and uses a selection control signal to determine how the value of the current signal bit is to be estimated. This is accomplished by using a selection facility which derives from the current sample value and the preceding and subsequent sample values the respective preaverage value and postaverage value and selects the value best suited for the estimation using the selection control signal. A phase corrector evaluates a signal pattern from an edge logic which indicates whether the current sample value is approaching an edge of the signal, and controls a change of the integration period if the residual-value signal lies within a predetermined residual value signal range.

12 Claims, 2 Drawing Sheets

SIGNAL SEPARATOR FOR SEPARATING TELETEXT BIT SEQUENCES FROM A BROADCAST TELEVISION SIGNAL

BACKGROUND OF THE INVENTION

1. Field of the Invention

The present invention relates to signal separators, particularly teletext-signal separators, including a sampling device which samples a signal bit sequence received with a transport signal at a sampling frequency higher than the frequency of the signal bit sequence, and a processing device for recovering the signal bit sequence from the sampled values.

2. Description of the Related Art

The following describes a processing device for recovering a teletext bit sequence from the sample values of a teletext bit sequence received with a television signal, with the teletext signal being sampled at a sampling frequency higher than the frequency of the teletext bit sequence. However, the television signal only represents a special case of a transport signal and the teletext bit sequence represents a special case of a signal bit sequence transported with the transport signal.

Whenever a signal bit sequence is sampled at a sampling frequency which is not an integral multiple of the signal frequency, and/or if very few sample values are supplied per signal bit, a signal separator of the type described herein can be used to improve the reliability of the estimation of the values of signal bits.

Since the introduction of teletext ("videotext"), television sets equipped with suitable decoders can receive additional information. This information is transmitted simultaneously with the picture in a normal television channel. It is displayed in the form of information pages which may consist of text and graphics and are transmitted line by line during the vertical blanking interval. The teletext data, which are transmitted with the composite picture signal, must be converted by the decoder into an error-free digital data stream. The structure of such teletext data lines is shown in FIG. 1 A teletext data line begins with a number of clock synchronization pulses, the so-called clock run-in (CRI), which are followed by a "framing code" (FC). These signal components, which serve synchronization purposes, are followed by data (DA) which are combined in 8-bit data words. The clock run-in consists of a two-byte long sequence of alternating 0's and 1's which represents the highest frequency occurring in the teletext signal. The clock run-in enables the teletext-signal separator, which is part of the teletext decoder, to synchronize with the bit stream. The framing code is one byte long and serves, among other things, to recognize the byte boundaries within a teletext signal.

The teletext signal, which has a bit frequency that depends on the respective teletext standard, is sampled at a clock frequency of the television set. The frequency at which the teletext signal is sampled is not linked to the teletext bit frequency. In a known chrominance-subcarrier-locked sampling system, the sampling frequency is, for example, four times the chrominance-subcarrier frequency. The teletext bit frequencies used are quite high, so that in the NTSC or PAL system, the sampling frequency is only about 2.5 times the bit frequency. Thus, at least in the case of these television standards, the sampling frequency used for digitizing the teletext signal is not an integral multiple of the teletext bit frequency used at the transmitting end. This means that the sampling instants of the teletext signal are not phase-locked to the teletext signal, but that, if the center of the teletext bit is taken as a reference, the center and the sampling instants drift relative to each other. Thus, in the case of successive teletext bits, the sampling instants are not always located at the same point of a teletext bit but move, for example, from one edge via the top to the second edge. The same applies analogously to real teletext signals, which may deviate considerably from the square shape. For example, the teletext signals may assume an approximately sinusoidal waveform. At the frequency ratio being considered, not more than 2.5 sample values are available on the average for the estimation of the binary values of the individual teletext bits. That is, not more than 2.5 sample values are available for the determination as to whether the current teletext bit is a logic 0 or 1, so that reliable recovery of the teletext signal is not automatically ensured.

Prior attempts to make such an estimation have included the method of selecting only a part of the successive sample values, namely alternately the second and third sample values (2-3 rhythm), which are each regarded as being representative of the value of a teletext bit. However, it has been found that noise on the teletext signal may result in a false beginning of this alternating selection, and thus, in an incorrect estimation of the values of the teletext bits. Since in the prior art circuit, the sampling frequency was chosen to be only approximately 2.5 times the teletext bit frequency, the safe assignment of the sample values selected in accordance with the 2-3 rhythm to the individual teletext bits is lost in the course of time.

In a television set, the tuner is followed by a bandpass filter which filters the desired signal out of the received frequency spectrum. If the tuner is not correctly tuned, the teletext signal may be distorted, which, in the case of the aforementioned 2-3 rhythm method, may result in an incorrect determination of the values of the teletext bits. It is the object of the present invention to improve the reliability of the estimation of the values of signal bits.

SUMMARY OF THE INVENTION

In a teletext-signal separator constructed in accordance with the invention, an estimation of the center of the respective teletext bit is made with the aid of a center-crossing signal delivered in the middle of the replicated period. From the sample values occurring within the teletext bit, that value is selected which lies closest to the instant at which the center-crossing signal occurs. This makes it possible to select, within the period of each teletext bit, that sample value of the teletext bit which is in a region where the estimation and the actual value are most likely to agree.

Unlike the method employing the rigid 2-3 rhythm, in which the respective second or third sample value is automatically selected even if it lies in the edge region of the respective teletext bit (i.e., in a region where interference has a greater effect than in the center portion of a pulse), the method according to the invention results in the selected sample values lying mostly in the center region of the teletext bit. Moreover, it has been found that the center region of the teletext bit is much less sensitive to interference.

A teletext-signal separator constructed in accordance with the teachings of the present invention includes an integrating unit which replicates the period of a teletext bit. Since the voltage indicating the logic value of the teletext bit is largest in the center portion of the teletext bit, the integrating unit is designed to deliver a center-crossing signal approximately in the middle of the replicated period. A residual-value signal delivered together with the center-crossing signal indicates the distance between the middle of the replicated period and the sample value at the time of occurrence of the center-crossing signal. The residual-value signal is fed to a residual-value-signal-evaluating device. The residual-value-signal-evaluating device contains a residual-value-signal-evaluation table which permits fast conversion of the respective residual value signal to a selection control signal or correction control signal without this taking up any computing time. The selection control signal thus generated is fed to a selection logic. This selection logic forms part of a selection facility, one input of which is supplied with the sample values of the teletext signal. From the current, i.e., instantaneous, sample value and the respective preceding sample value, a preaverage value is formed, while a postaverage value is formed from the current sample value and the subsequent sample value. Depending on the respective selection control signal applied to it, the selection logic, to which the current sample value as well as the preaverage value and the postaverage value are provided, selects the value most favorable for the estimation of the value of the teletext bit being considered.

The selection facility supplies a number of successive sample values to an edge logic. The edge logic generates a signal pattern which indicates the phase position of the current sample value relative to the adjacent edges of the sampled teletext bit sequence. This signal pattern generated by the edge logic, which shows whether the current sample value has approached an adjacent edge of the teletext signal up to a predetermined distance, is fed, together with a correction control signal provided by the residual-value-signal-evaluating device, to a phase corrector. The phase corrector delivers a signal to the integrating unit if the current sample value moves away from the center of the teletext bit but is still in the center region defined by an upper and a lower residual threshold value. The signal delivered to the integrating unit influences the instant of the delivery of the center-crossing signal by the integrating unit and/or the residual-value signal.

The integrating unit is preferably started by a start pulse from a start detector which is connected to the selection facility and detects the start of the teletext data line. The teletext bits resulting from the estimation are fed to a frame code detector which, after detecting the frame code, makes the data bits available byte by byte for further processing. In addition, after detecting the frame code, the frame code detector advantageously delivers to the integrating unit a signal which, if a correction is necessary, causes the phase corrector to influence the instant of occurrence of the center-crossing signal and/or the formation of the residual-value signal less strongly than before the detection of the frame code.

The selection facility preferably includes a first register and a second register. The first register is preferably fed with the signs of the sample values of the teletext bit, while the second register is fed with the averages of every two successive sample values from an averaging circuit. The averaging circuit preferably contains a delay element followed by a two-input adder. The delay element introduces a delay equal to one sampling period. One input of the adder is connected to the input of the delay element, while the second input is connected to the output of the delay element. From the sum signal, the sign, indicating the average value, is separated and fed to the second register.

The number of register stages is chosen so that the stage of the first register which contains the sign of the current sample is preceded by N register stages, and that N-1 register stages are connected between the adder and those stages of the second register which contain the postaverage value and the preaverage value. In such an embodiment, the edge logic is preferably supplied with the outputs from the stages of the first register, but instead or in addition, the outputs from the second register may be fed to the edge logic.

A preferred embodiment of the integrating unit includes an accumulating adder to which an increment to be accumulated is applied from an increment generator at every sampling instant. In relation to the largest value representable by the accumulator and to the clock rate, the magnitude of the applied increment is chosen so that, on a time average, the adder, which accumulates from 0, reaches its final value as exactly as possible within a period equal to the period of one teletext bit. In this embodiment of the integrating unit, the center-crossing signal is generated and the residual-value signal is output in the form of the binary pattern at the sampling instant at which half the maximum value of the accumulator is reached or exceeded as a result of the increment addition. The binary pattern covers at least the higher-order bits of the accumulator contents except the most significant bit.

DETAILED DESCRIPTION OF THE INVENTION

Figures 1, 2:
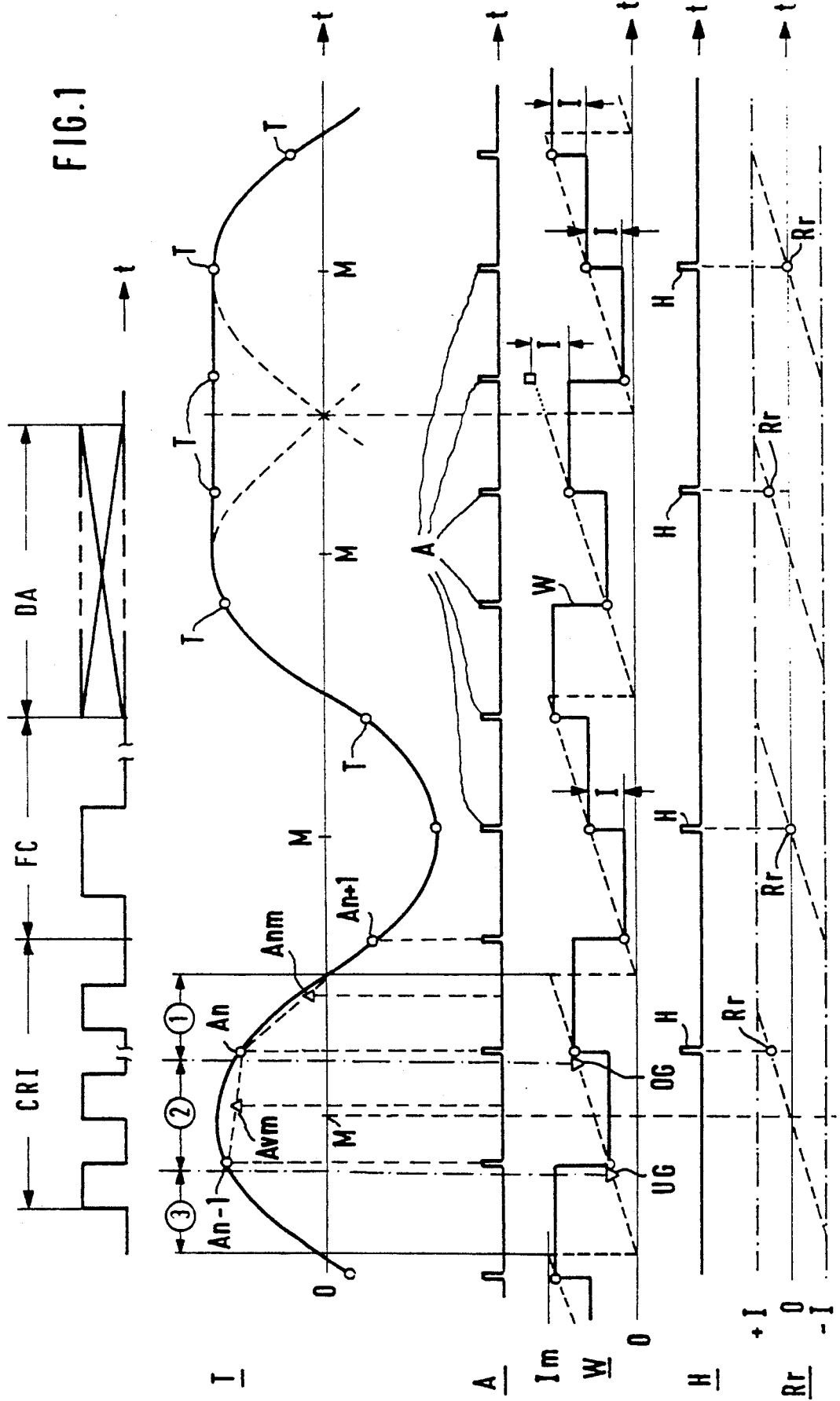
FIG. 1 shows the structure of a teletext data line.
FIG. 2 illustrates timing diagrams which show the phase relationships between a teletext data signal, a clock sample signal, an accumulator output signal, a center-crossing signal, and a residual value signal.
Figure 3:
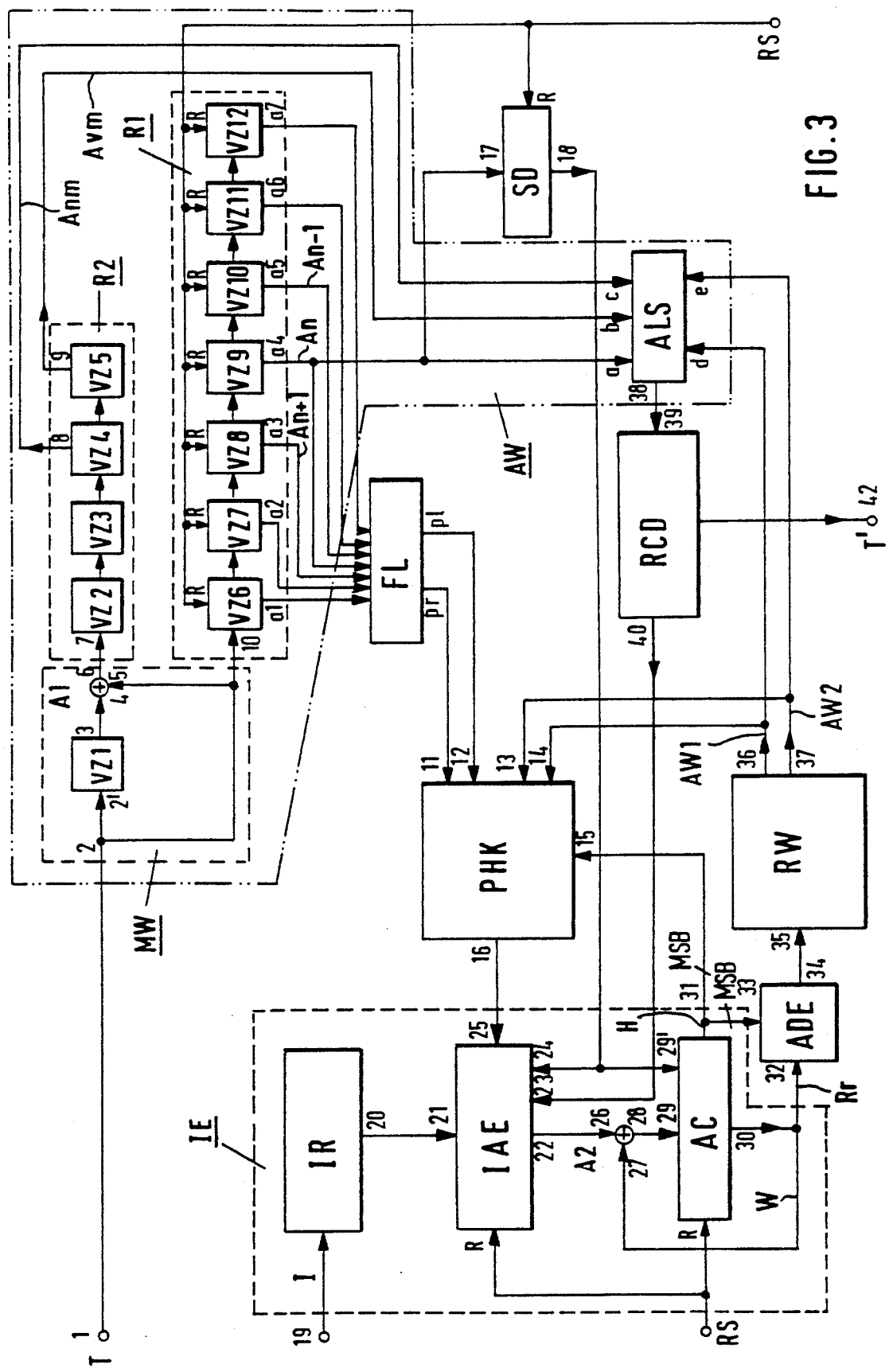
FIG. 3 shows a preferred embodiment of the teletext-bit separator according to the invention.

FIG. 3 shows a preferred embodiment of a teletext-signal separator according to the invention. The teletext signal T, after being sampled and digitized by devices not shown in FIG. 3, is applied to an input 1 of the teletext-signal separator. In FIG. 2, the solid waveform represents the original teletext signal having the quantized values T (represented by open circles on the teletext waveform) sampled periodically. The quantized sample values are fed to an input 2 of an averaging circuit MW for interpolation. The averaging circuit MW contains an adder A1 and a delay element VZ1. An input 2' of the delay element VZ1 is connected to the input 2 of the averaging circuit MW and to one input 5 of the adder A1. A second input 4 of the adder A1 is supplied with the sample values delayed by one clock period, which are available at an output 3 of the delay element VZ1. From the sum delivered at an output 6 of the adder A1, a bit representing the sign is separated and applied to an input 7 of a register R2. The register R2 comprises four delay elements VZ2 ... VZ5 which each provide a delay equal to one clock period (i.e., the period of the clock pulse A of FIG. 2).

Besides being coupled to the averaging circuit MW, the input 1 of the teletext-signal separator is connected to an input 10 of a register R1. This connection is so designed that only the signs of the sample values T applied at the input 1 are transferred to the input 10 of the register R1, i.e., to the input of a delay element VZ6 in the register R1. The register R1 comprises seven delay elements VZ6 ... VZ12 connected in series. Each of these delay elements provides a delay equal to one clock period. Each delay element of the register R1 has an input R which is connected to a reset input RS of the teletext-signal separator.

The outputs a1 ... a7 of the delay elements VZ6 ... VZ12 of the register R1 are applied to the inputs of an edge logic FL. Two outputs of the edge logic FL provide signal patterns pr and pl to a phase corrector PHK and are coupled to inputs 11 and 12 of the phase corrector PHK. The signal patterns pr and pl cause a phase correction in one direction or the other, e.g., toward the right or left.

The output a4 of the delay element VZ9 of the register R1, besides being Coupled to the edge logic FL, is connected to one input a of a selection logic ALS, which is part of a selection facility AW, and to one input 17 of a start detector SD. Another input R of the start detector SD is connected to the reset input RS. Two further inputs b and c of the selection logic ALS are Connected to outputs 9 and 8 of the delay elements VZ4 and VZ5 of the register R2.

An integrating unit IE includes an increment generator IR. An increment I is fed to the teletext-signal separator at an input 19 of the increment generator IR. An output 20 of the increment generator IR is coupled to one input 21 of an increment changer IAE. Another input 24 of the increment changer IAE receives a start pulse from an output 18 of the start detector SD which initiates the accumulation process. This start pulse is also applied to a clear input 29' of the accmulator AC. An input 23 of the increment changer IAE is connected to an output 40 of a frame code detector RCD. An input 39 of this frame code detector RCD is coupled to an output 38 of the selection logic ALS. The teletext bits determined by estimation are available at another output 42 of the frame code detector RCD.

The integrating unit IE further includes an accumulating adder formed by an adder A2 and an accumulator AC. One input 26 of the adder A2 is connected to an output 22 of the increment changer IAE, and one output 30 of the accumulator AC feeds a value W stored in this accumulator AC to another input 27 of the adder A2. A sum output 2s of the adder A2 passes the new value to an input 29 of the accumulator AC. It will be assumed that the accumulator AC has a data register with a width of 20 bits. The most significant bit MSB of the Value stored in the accumulator AC is available at an output 31 of the accumulator AC. This output 31 of the accumulator AC is coupled to one input 15 of the phase corrector PHK and to a control input 33 of an addressing unit ADE serving as a gate circuit for a residual-value signal Rr from the accumulator AC. The most significant bit and the 13 least significant bits are separated from the data word provided at the output 30 of the accumulator AC. The remaining six bits represent the residual-value signal Rr and are fed to an input 32 of the addressing unit ADE. A six-bit address is applied to an input 35 of a residual-value-signal-evaluating device RW from an output 34 of the addressing unit ADE. The latter is designed as a random-access memory in which a residual-value-signal evaluation table is stored. The residual-value-signal-evaluating device RW, provides selection control signals AW1 and AW2 on two outputs 36 and 37. The outputs 36 and 37 are coupled to inputs 14 and 13 of the phase corrector PHK and are coupled to select inputs d and e of the selection circuit ALS. An output 16 of the phase corrector PHK is connected to an input 25 of the increment changer IAE.

The operation of this preferred teletext-signal separator circuit is described with reference to FIGS. 2 and 3 as follows.

A device, not shown in FIG. 3, samples the teletext bit sequence and conditions it so that signed binary sampling-data words T are presented to the input 1 of the teletext-signal separator, which arrive at intervals of one sampling period as illustrated by the waveform A in FIG. 2. Since the positive or negative signs of the individual binary sampling-data words indicate whether the sampled teletext bit is a 0 or a 1, it suffices to process only the sign. Therefore, the signs are separated and applied to the register R1 at its input 10. The signs which are already in the register R1 are passed from delay element to delay element at the separator clock rate, which is identical to the sampling clock rate.

Besides being applied to the input 10 of the register R1, the sample values arriving at the input of the teletext-signal separator are fed to the averaging circuit MW. In the averaging circuit, every two adjacent successive sample values are added. To this end, the respective preceding sample value is delayed by the delay element VZ1 and applied to one input of the adder A1, and the succeeding sample value is applied to the other input. From the sum thus obtained, the sign, which represents the average value of these two sample values being considered, is separated. These average values are fed to the second register R2. The fundamental idea of this averaging is an apparent doubling of the sampling frequency. Thus, instead of a sample value which is far away from the center of the teletext bit and, therefore, so low that it may be falsified by disturbances, use can be made of a quasi sampling value which is closer to the center of the teletext bit.

The binary values appearing at the outputs 8 and 9 of the register R2 indicate the values of the sampled teletext signal in the middle between the current, i.e., instantaneous, sample value An at a4 and the subsequent An+1 and the preceding An−1 sample values, respectively, and will be referred to as postaverage value Anm and preaverage value Avm, respectively. In terms of cost, such an apparent doubling of the number of sample values, even if the additional sample values obtained by averaging do not provide the exact value of the teletext signal between two sampling instants, is a good alternative to the more complicated and more expensive doubling of the sampling frequency. If required, an even more accurate interpolation can be performed by taking the average of more than two adjacent sample values.

After the fifth clock pulse, the signs of the sample values have been shifted in the register R1 to the point that the sign of the first sample value is present at the output a4 of the delay element VZ9. At that instant, the postaverage value and the preaverage value whose formation involved the sign referred to as the "current sample value," which appears at the output a4 of the delay element VZ9, are present at the outputs 8 and 9, respectively, of the delay elements VZ4 and VZ5 of the register R2. Depending on where the current sample value present at a4 is located in the teletext bit being considered, either the current sample value itself or the preaverage or postaverage value is used for estimating the value of the teletext bit. To this end, these quantities are fed to the selection logic ALS in the selection facility. When the output a4 changes from 0 to 1 for the first time, the start detector SD supplies to the integrating unit IE a start pulse initiating an accumulation process.

The invention is based on recognition that in the case of real teletext signals T, the maximum signal amplitudes are generally located at the center M of the teletext bit under consideration. Therefore, the instants of the centers of the teletext bits are determined with the aid of the integrator IE. To this end, the period of the teletext bits is replicated by means of the integrating unit IE, and a center-crossing signal H is generated approximately in the middle of the replicated period. The contents W of the accumulating adder AC are increased by the value of an increment I upon receipt of each clock pulse A (FIG. 2). This increment I is stored in the increment generator IR, which is designed as a register. The integrating unit IE is designed so that, as exactly as possible, one teletext-bit period has elapsed when a maximum value Im, representable by the accumulator AC, is reached as a result of the accumulating addition starting from 0. From this requirement and the fact that the clock rate and the maximum value representable by the accumulator AC are known, the required increment I can be calculated. Since the frequency or period generated by such an integrating unit IE can only be changed in steps, the bit width of the accumulator AC must be chosen so that the desired resolution is obtained. When the accumulator AC has reached or exceeded one-half of its maximum value Im as a result of the accumulating addition, the most significant bit changes its state. A signal indicating this change of state forms the crossing signal H, which marks the approximate center of the teletext bit and is available at the output 31 of the integrating unit IE. The discrete instants at which a center-crossing signal can occur are fixed by the clock rate A of the teletext-signal separator, which is equal to the rate at which the received teletext signal is sampled. The center-crossing signal H is thus delivered at the output 31 of the accumulator AC on the clock pulse occurring either exactly upon attainment of one-half of the replicated period or shortly thereafter. The approximate middle of the replicated period is determined by the center-crossing signal H provided at the output 31.

To obtain more accurate information on the position of the middle of the replicated period relative to the current sample value occurring with the center-crossing signal, the integrating unit IE provides a residual value or a residual-value signal Rr. This residual value, e.g., in two's complement representation, indicates the time between the attainment of the middle M of the replicated period and the occurrence of the center-crossing signal H delivered upon receipt of the next clock pulse. If it is first assumed that the middle of the replicated period coincides with the actual center of the respective teletext bit, the residual value indicates in which direction and how much the instant at which the current sample value occurred deviates from the teletext-bit center assumed as particularly favorable for the estimation of the value of the teletext bit. This information can be used to improve the estimation of the value of the current teletext bit.

If the rigid 2-3 rhythm is used, a sample value predetermined by the 2-3 count rhythm will be used to estimate the value of the current teletext bit, even if it is located at one of the edges of the teletext bit, although there the voltage of the teletext being considered is less than at the center of the bit and hence, particularly sensitive to errors caused by, e.g., noise. In the invention, however, the residual value is evaluated to determine where the current sample value at the instant of occurrence of the respective zero-crossing signal is located within a teletext bit.

The range of the residual value Rr is preferably divided into three subranges indicated by the circled numerals 1, 2, and 3 in FIG. 2. Subrange 1 covers residual values for which $(OG \times Im) < Rr < Im$. Subrange 2 is characterized by residual values for which $(UG \times Im) \leq Rr \leq (OG \times Im)$, while subrange 3 characterizes residual values for which $0 \leq Rr \leq (UG \times Im)$, where the values OG (the upper residual value threshold) and UG (the lower residual value threshold) are constants. In a preferred embodiment of the invention, the value 0.75 was chosen for OG, and the value 0.25 for UG. Other values may be taken as required by the system parameters or application. By means of the three subranges, the current sample values are divided into three groups: a group in which the associated residual value indicates that the current sample value is in a range limited by an upper and a lower residual threshold value and lying around the center of the teletext bit, and two further groups to which belong current sample values lying in the left-hand and right-hand edge regions, respectively, of the teletext bit T. The widths and divisions of the ranges may also be chosen differently, depending on the specific embodiment. The embodiment being considered here is based on a design of the integrating unit in relation to the teletext-bit width in which the center of the teletext bit and a sampling instant coincide at a residual value Rr equal to Im/2. Other designs in which this coincidence occurs at, e.g., Rr=0 are also possible.

In the signal waveform T of FIG. 2, the current sample value provided at the output a4 of the delay element VZ9 is designated An. The sample labeled An+1 denotes the subsequent sample value, and the sample An−1 denotes the preceding sampling value. The preaverage value Avm, determined by floating averaging, is located in the middle between An and An−1, and the postaverage value Anm is located in the middle between An and An+1. These two values are also shown in FIG. 2. If the residual value Rr indicates that the current sample value An is not within subrange 2, i.e., not near the center of the teletext bit, the current sample value An will not be used for estimating the value of the teletext bit. If the current sample value lies in subrange 1, the preaverage value Avm, formed from An and An−1, will be used for estimating the value of the current teletext bit. If the current sample value lies in subrange 3, the value will be estimated from the current sample value An and the subsequent sample value An+1, which together form the postaverage value Anm. In FIG. 2, it is shown, with the aid of a sinusoidal teletext bit T, that this procedure is expedient, since in cases where the current sample values An lie in subrange 1 or subrange 3, noise and/or other disturbances deforming the teletext bits may easily result in a false estimation of the actual value of the teletext bit. If required, the range of residual values may also be divided into more than three subranges.

The residual-value signal Rr, which is generated as described above, is fed to the data input 32 of the addressing unit ADE, which activates the residual-value-signal-evaluating device RW when the most significant bit of the accumulator AC, the center-crossing signal H, is applied at the input 33. The residual-value-signal-evaluating device Rw evaluates the residual value by providing to the selection facility AW a selection control signal AW1, AW2 depending on the magnitude of the residual value. The selection control signal AW1, AW2 indicates which of the three groups the current sample value An must be assigned to. Since the residual value Rr can deviate from half the accumulated value Im/2 by one increment value I at the most, the most significant bit of the accumulator signal W need not be taken into account in evaluating the residual value Rr. In the preferred embodiment being described, the residual-value-signal-evaluating device RW includes a random-access memory containing a residual-value evaluation table which is addressed by the six-bit data word indicating the residual value. For a finer resolution, a wider data word and, consequently, a larger residual-value evaluation table could be used.

In this embodiment, the selection control signal AW1, AW2 also represents the correction control signal. By means of the selection control signal AW1, AW2 applied to the selection logic ALS from the residual-value-evaluating device RW, the selection logic ALS determines whether the current sample value An is to be used for estimating the current teletext bit or whether, since the current sample value An already lies a little farther from the center of the teletext bit, the preaverage Avm or postaverage value Anm is to be used for the estimation.

Thus, in a teletext-signal separator according to the invention, the estimation can flexibly respond to the position of the current sample value within the teletext bit. In addition, the position of the current sample value within the teletext bit can be observed continuously. This is done in the edge logic FL. The edge logic FL is supplied with the output signals from all seven delay elements VZ6 ... VZ12 of the register R1. Since, in the example being considered, a teletext bit is represented by approximately 2.5 sample values, the seven sample values stored in the register R1 are sufficient to determine whether an edge or a zero crossing of the teletext signal represented by these sample values comes too close to the current sample value. The edge logic FL contains a logic circuit which combines the signals applied at its inputs according to the rules of Boolean logic and generates at the outputs of the edge logic FL a signal pattern pr, pl which indicates the phase position of the current sample value relative to at least that edge of the sampled teletext-bit sequence which is adjacent to this sample value. The signal pattern pr, pl is fed, together with the correction control signal from the residual-value-signal-evaluating device RW, to the phase corrector PHK. The phase controller PHK supplies a signal to the increment changer IAE which causes the increment changer to change the increment which is added to the accumulator contents upon receipt of the next clock pulse. This is done when the current sample value is located away from the center of the teletext bit but still within the center region defined by the upper and lower residual threshold values. In the embodiment described, a single change of the increment by the different value (I−f) is caused in dependence upon the values for pl and pr delivered by the edge logic, where f is a correction quantity which, in the embodiment chosen, is $+/-(\frac{1}{8})$ during the CRI bits and the F/C bits, and $+/-(1/16)$ during the DA bits. This changed increment is added only once during an accumulation period, namely on the occurrence of the center-crossing signal. During each of the remaining clock periods, the increment I stored in the increment generator IR is accumulated by the adder. In this case, the accumulator serves as a control system filter which compensates for the effect of the irregular changes of the increment value on the exact replication of the teletext bit period. This procedure results in a change of the residual value, which leads to a change of the selection control signal AW1, AW2 and, thus, to a change in the selection from the current sample value, the preaverage value, and the postaverage value. The change of the residual value may also result in the center-crossing signal occurring one sampling instant earlier or later than before, so that the new current sample value moves closer to the middle of the replicated period and, thus, closer to the center of the teletext bit.

The value of the current teletext bit, determined by the selection logic ALS by means of the selection control signal AW1, AW2, is passed to the frame code detector RCD, which, after detecting the frame code FC, provides the estimated teletext data bits T' byte by byte at its output 42. At the output 40 of the frame code detector RCD, after detection of the frame code FC, a signal is provided by which f is changed from $\frac{1}{8}$ to 1/16. Thus, the phase correction is switched from coarse to fine correction. After all teletext data bits have been received, a signal applied at the reset input RS resets the accumulator AC, the increment changer IAE, the start detector SD, and the outputs of the delay elements of the register R1. The teletext-bit separator is thus ready to receive the next teletext data line.

What is claimed is:
1. A teletext-signal separator, comprising:
   a sampling device which samples a signal bit sequence received with a transport signal at a sampling frequency higher than a frequency of the signal bit sequence; and
   a processing device for recovering said signal bit sequence from the sample values, said processing device comprising:
      a selection facility which, in response to control signals, provides one of a plurality of said sample values, said plurality of said sample values including a current sample value, a preaverage value formed from said current sample value and a preceding sample value, and a postaverage value formed from said current sample value and a subsequent sample value;
      an edge logic which generates a signal pattern indicating the phase position of said current sample value relative to at least those edges of the signal bit sequence which are adjacent to said current sample value;
      an integrating unit which performs a periodically overflowing integration to provide an integration value up to a final value, the first integration process being started by a sample value indicating the beginning of a first signal bit, and an integrand being formed by such a value that a sampling instant at which the final value is exceeded coincides essentially with the end of a signal bit, said integrand having the value changeable by a control signal, said integrating unit further delivering a center-crossing signal at each sampling instant at which the integration value of said periodically overflowing integration is closest to one-half of the final value, and a residual-value signal having a residual value whose magnitude corresponds to the distance between one-half of the final value and said integration value occurring at said sampling instant;

a residual-value-signal-evaluating device which, on the occurrence of each center-crossing signal delivers to the selection facility a selection control signal for selecting one of:

the current sample value if the residual value of the residual-value signal lies between a lower residual threshold value and an upper residual threshold value;

the preaverage value if the residual value of the residual-value signal lies above the upper residual threshold value; and the postaverage value if the residual value of the residual-value signal lies below the lower residual threshold value;

said residual-value-signal-evaluating device further providing a correction control signal which indicates whether a respective residual value of said residual-value signal at each sampling instant is within or outside two limits of a predetermined residual value signal range, said upper and lower residual threshold values and said two limits of the residual value signal range each lying on both sides of that residual value signal value which is obtained if the sampling instant and the instant of occurrence of half the final value coincide; and a phase corrector which, when said signal pattern delivered by said edge logic indicates that said current sample value has approached an adjacent edge of the signal bit up to a predetermined distance, controls a change of the value of said integrand in response to said correction control signal if said residual value of said residual-value signal lies within the predetermined residual value signal range.

2. A signal separator as defined in claim 1, wherein said selection facility comprises a first register, a second register, and an averaging circuit preceding said second register, wherein the contents of a centrally located register stage in the center region of said first register represents said current sample value, said first register having a plurality of peripheral register stages on both sides of said centrally located register stage containing said current sample value, so that pulse edges of said signal bit sequence which occur in the neighborhood of said current sample value are represented by sample values stored within said peripheral register stages, said second register having at least two register stages in which said preaverage and postaverage values adjacent to said current sample value are represented.

3. A signal separator as defined in claim 2, wherein:
said averaging circuit comprises a one-sampling-period delay element, having an input and an output, said one-sampling-period delay element followed by an adder having two inputs, one of which is connected to the input of said one-sampling-period delay element and the other of which is connected to the output of said one-sampling-period delay element;

said centrally located register stage of said first register containing the current sample value is preceded by N register stages; and said centrally located register stage containing said postaverage value having N−1 register stages between said adder and said register stage containing said postaverage value.

4. A signal separator as defined in claim 2, wherein said plurality of peripheral register stages of both of said first and second registers contain only the signs of the associated sample values and average values, respectively.

5. A signal separator as defined in claim 2, wherein said edge logic is formed by a logic circuit combining the outputs of said plurality of peripheral register stages of at least said first register.

6. A signal separator as defined in claim 2, further comprising a start detector for detecting the start of the first signal bit, said start detector connected between the output of said centrally located register stage containing said current sample value and a start control input of said integrating unit.

7. A signal separator as defined in claim 1, wherein:
said integrating unit includes an accumulating adder to which an increment to be accumulated is fed as said integrand from an increment generator at each sampling instant, said accumulating adder incrementing from zero;

said final value of the periodically overflowing integration and the magnitude of the increment are chosen in relation to said frequency of said sampling device so that, on a time average, said accumulating adder reaches said final value as exactly as possible within a period equal to the period of one signal bit;

at the sampling instant at which said accumulating adder reaches or exceeds one-half of said final value as a result of the increment addition such that the most significant bit of said accumulating adder changes its binary value, said accumulating adder:
generates said center-crossing signal; and
delivers said residual-value signal in the form of a binary pattern which is formed by the contents of at, least the most significant stages of said accumulating adder except the adding stage containing the most significant bit.

8. A signal separator as defined in claim 7, wherein said increment generator has a controllable increment changer associated therewith which changes said increment by a difference value under control of said phase corrector where f is a correction quantity.

9. A signal separator as defined in claim 8, wherein:
said signal bit sequence begins with a number of clock synchronizing pulses followed by a frame code followed finally by data bits to be transmitted;
said selection facility is followed by a frame code detector;
said correction quantity f of the increment changer is controllable to assume different values, said frame code detector having a correction quantity control output via which said frame code detector controls, after detection of the frame code, a correction control quantity smaller than the correction control quantity controlled prior to the detection of the frame code.

10. A signal separator as defined in claim 8, wherein said controllable increment changer performs the correction of said increment once per integration period on the occurrence of said center-crossing signal.

11. A signal separator as defined in claim 7, wherein said residual-value-signal-evaluating device contains an evaluation table which is stored in a memory and, when addressed by said respective residual value, provides said selection control signal for said selection facility and said correction control signal for said phase corrector.

12. A signal separator as defined in claim 1, wherein said lower and upper residual threshold values coincide with said two limits of the residual value signal range, and said selection control signal also forms said correction control signal.

* * * * *